C. W. OSBORNE.
DRAIN PIPE.
APPLICATION FILED NOV. 12, 1910.
986,940.
Patented Mar. 14, 1911.
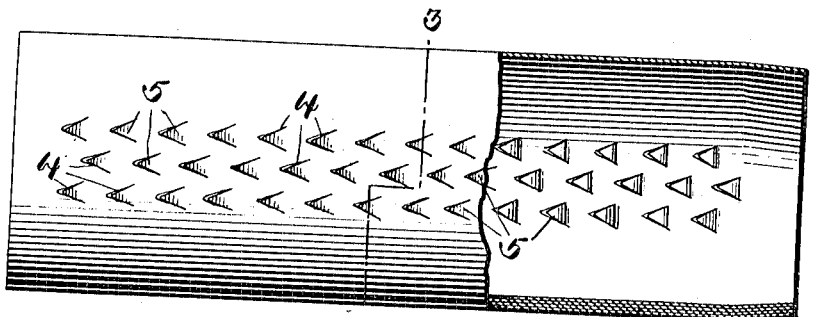
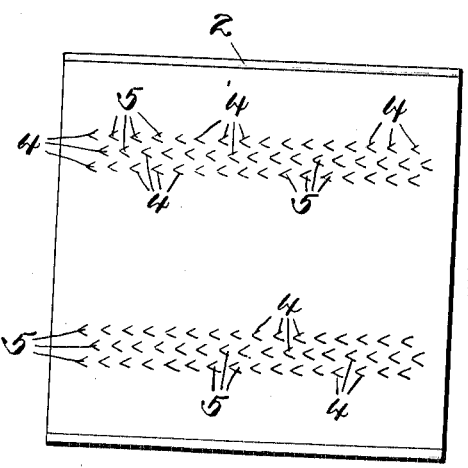
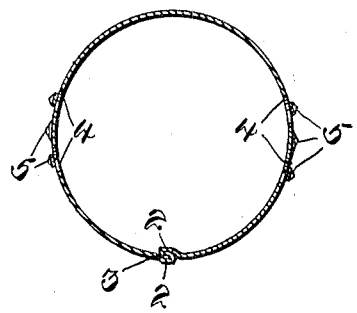
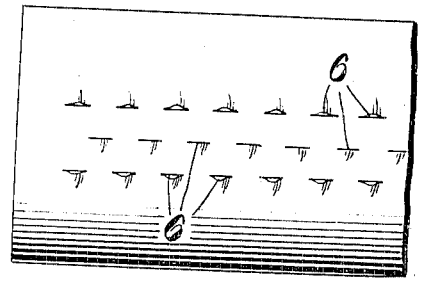
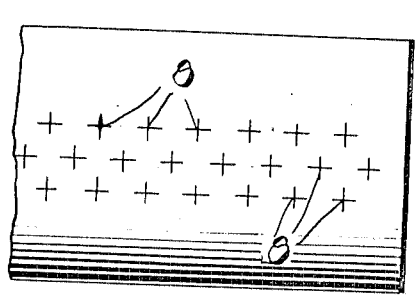
Witnesses
Inventor
C. W. Osborne.
By Watson E. Coleman.
Attorney

UNITED STATES PATENT OFFICE.

CHARLES W. OSBORNE, OF LUBBOCK, TEXAS.

DRAIN-PIPE.

986,940.

Specification of Letters Patent. Patented Mar. 14, 1911.

Application filed November 12, 1910. Serial No. 592,051.

*To all whom it may concern:*

Be it known that I, CHARLES W. OSBORNE, a citizen of the United States, residing at Lubbock, in the county of Lubbock and State of Texas, have invented certain new and useful Improvements in Drain-Pipes, of which the following is a specification, reference being had to the accompanying drawings.

My invention is an improved pipe made of sheet metal and especially adapted for use for sub or underground irrigation, to irrigate land, and also for use as a casing for a well, and for underground drainage, the invention consisting in the construction of the pipe hereinafter described and claimed.

In the accompanying drawings—Figure 1 is partly an elevation and partly a sectional view of a section of pipe constructed in accordance with my invention. Fig. 2 is a plan of the blank from which the pipe section is formed. Fig. 3 is a transverse sectional view of the pipe. Figs. 4 and 5 are detail elevations of modified forms of my improved pipe. Fig. 6 is a detail longitudinal sectional view of the form of pipe shown in Fig. 1, and showing one of the out-turned tongues.

My improved pipe is made in sections of suitable length and may be made of any suitable diameter. Each section of my improved pipe is made from a single blank of sheet metal, preferably galvanized sheet iron, which blank is of oblong rectangular form, and is crimped at its longitudinal side edges to provide flanges 2 which when the blank is bent into cylindrical form, to form the pipe sections, are interlocked as at 3, so as to secure the edges of the blank together, and form a seam in the lower side of the pipe. Said interlocked flanges of the pipe section may be riveted or soldered, or otherwise suitably secured. The blank sheet, before the pipe section is made therefrom, is provided at points between and spaced from its side edges and its longitudinal center, with series of longitudinally directed V-shaped slits 4, which form triangular tongues 5, which are struck up so as to incline them outwardly from the outside of the blank which is to correspond with the outer side of the pipe section made from the blank. These tongues project toward that end of the pipe which is uppermost when the pipe is laid, either in an irrigating or draining ditch, or in a well so that the tongues while overhanging the openings formed thereby in the sides of the pipe, prevent the entrance of particles into the pipe while permitting water to freely enter through the said openings and to flow through the pipe.

In practice one end of the pipe section is slightly smaller than the other so that the smaller end of each pipe section may be fitted into the larger end of the next adjacent pipe section, and thereby enable the pipe sections to be readily coupled together when they are laid or placed in a ditch or in a well for use.

The tongues which overhang the openings in the sides of the pipe sections project toward the larger upper ends of the pipe sections. The openings in the pipe formed by the slits therein, and the outwardly projecting tongues are disposed between and spaced from the bottom and top of the pipe so that while the side portions of the pipe are perforated, the bottom and top thereof are imperforate.

In the modified form of my invention shown in Fig. 4, the slits 6 in the sides of the pipe are longitudinal of the pipe and parallel with one another, and the central portion of each slit is widened by outturning the material forming the side edges of the slit.

In the form of my invention shown in Fig. 5, the pipe is provided with cross slits 8, and the material in the angles between the cross slits is outturned.

My improved pipe is especially adapted for use for irrigating purposes, for well casings, and also for under ground draining, may be very readily and cheaply manufactured, is extremely strong and durable, and while admitting water readily thereto, owing to the provision of the slightly outturned tongues formed by and between the slits in the pipe, prevents the entrance of sand, gravel, and earthy particles, and hence prevents the pipe from clogging up.

I claim:—

1. A sheet metal pipe of the class described provided in its sides with slits for the admission of water, the material forming the sides of the said slits being outturned to overhang the openings formed by and between the slits for the purpose set forth.

2. A sheet metal pipe of the class described having longitudinally directed V-shaped slits, the tongues in the angles between the said slits being outturned.

In testimony whereof I hereunto affix my signature in the presence of two witnesses.

CHARLES W. OSBORNE.

Witnesses:
E. L. KLETT,
B. O. McWHORTER.